United States Patent [19]

Kerai

[11] Patent Number: 4,801,914

[45] Date of Patent: Jan. 31, 1989

[54] INFINITELY VARIABLE ROTARY RESISTOR ASSEMBLY

[76] Inventor: Manji R. K. Kerai, 98 Burrows Road, London, NW10 5SH, Great Britain

[21] Appl. No.: 51,559

[22] Filed: May 18, 1987

[30] Foreign Application Priority Data

May 19, 1986 [GB] United Kingdom ................ 8612130
Mar. 11, 1987 [GB] United Kingdom ................ 8705795

[51] Int. Cl.$^4$ ........................................... H01C 10/32
[52] U.S. Cl. .................................... 338/162; 338/170
[58] Field of Search ............... 338/170, 167, 162, 163, 338/171

[56] References Cited

U.S. PATENT DOCUMENTS 4,621,250 11/1986 Echasserlau et al. ............... 338/162

Primary Examiner—E. A. Goldberg
Assistant Examiner—M. M. Lateef

[57] ABSTRACT

An infinitely variable rotary resistor assembly has a substantially conventional rotary resistance element 1 mounted for rotation in a housing 2, on rotation of a projecting shaft 4. The resistance element 1 is biased to a predetermined position by spring means 14,15 mounted within the housing 2 on a shaft 6.

In an alternative form of the invention, a substantially conventional rotary variable resistor 20 is biased to a predetermined position by a biasing device mounted over the housing of the rotary variable resistor 20 to snap engage therewith, and coupling with an accessible part 37 of a rotary resistance element in the resistor.

5 Claims, 3 Drawing Sheets

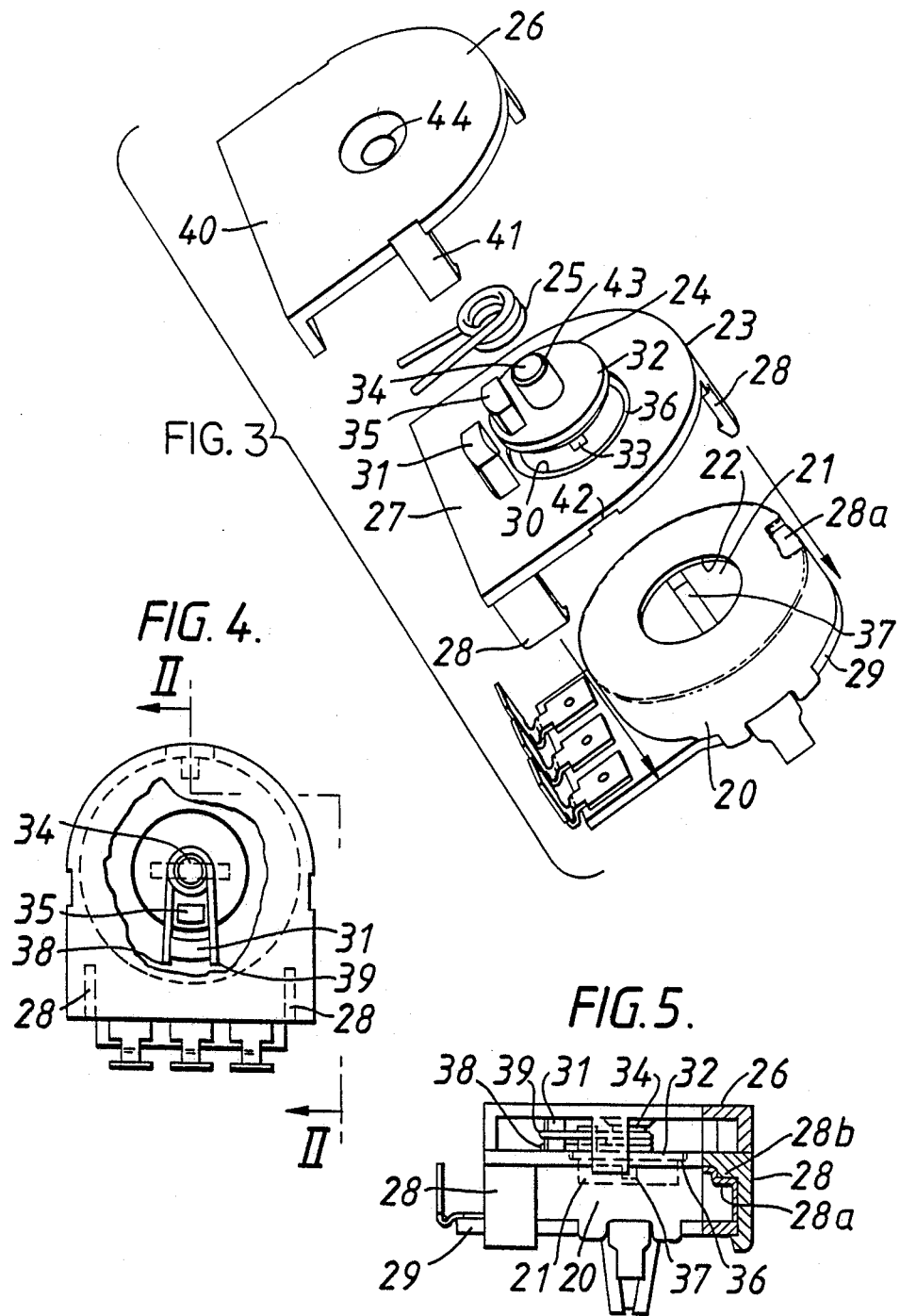

INFINITELY VARIABLE ROTARY RESISTOR ASSEMBLY

TECHNICAL FIELD

The present invention relates to infinitely variable rotary resistor assemblies such as potentiometers, or rotary switches which are adjusted by rotary as opposed to linear displacement of a sliding contact to alter the resistance provided by the assembly or open or close a circuit. The present invention was primarily developed for application to rotary variable potentiometers, or rotary switches such as those used in joystick control devices which independently control two or more potentiometers, or switches and are commonly employed for so called computerized video games and other electrical equipment. However, it should be realised that the present invention is not intended to be used solely in joystick devices.

STATEMENT OF INVENTION AND ADVANTAGES

According to the present invention there is provided an infinitely variable rotary resistor assembly comprising an electrical element rotatably mounted in a housing, rotation of said element effecting a change in an electric current flowing through the assembly; and a biasing means enclosed by the housing and acting between the electrical element and the housing to rotationally bias the electrical element to a predetermined position.

Further according to the present invention there is provided an infinitely variable rotary resistor assembly comprising an electrical element rotatably mounted by a shaft in a housing, rotation of said shaft effecting a change in an electric current conducted through the assembly, and wherein a shaft engaging part is mounted on the housing to couple with the shaft, said part having associated therewith biasing means which reacts relatively between the housing and that part to bias the shaft engaging part and therethrough the electrical element rotationally to a predetermined position.

By the arrangement specified in the penultimate preceding paragraph an infinitely variable rotary resistor assembly is rotationally biased to a predetermined neutral position by a resilient biasing means located in the same housing as the rotationally adjustable electrical element. The infinitely variable rotary resistor assembly may comprise either a rotary variable resistor or potentiometer or a simple on/off switch. Thus when the infinitely variable rotary resistor assembly of the present invention is used in the construction of an aggregate assembly such as a self centering joystick control (that is a joystick control biased to a predetermined neutral position) there are the advantages that the number of components required in the aggregate assembly can be reduced (and thus the expense and time required for manufacture can be reduced) and also the aggregate assembly can be compacted in comparison with conventional structures.

By the further form of the present invention as specified above a rotary switch or a conventional form of rotary resistor can conveniently be adapted by the application thereto of the biasing means so that its electrical element is biased to a predetermined neutral position. Thus, for example, it is possible to convert an existing unbiased joystick to a self centering type of joystick by simply affixing appropriate biasing means to the rotary variable resistors in situ on the joystick.

Still further according to the present invention there is provided a joystick control device which includes an infinitely variable rotary resistor assembly as previously specified as being in accordance with the present invention.

DRAWINGS

Embodiments of an infinitely variable rotary resistor assemblies constructed in accordance with the present invention will now be described, by way of example only, with reference to accompanying illustrative drawings, in which;

FIG. 3 is an exploded view illustrating a second embodiment of the invention wherein a biasing means is secured to a conventional potentiometer;

FIG. 4 is a plan view of the second embodiment of the invention with a cover partially cut away to show the biasing means, and FIG. 5 is a sectional view on the line II—II of the second embodiment of the assembly illustrated in FIG. 4.

DETAILED DESCRIPTION OF DRAWINGS

Figure 1:
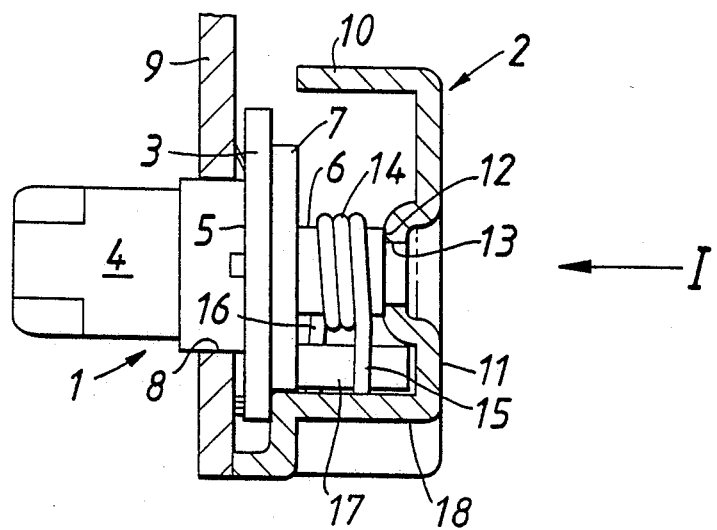
FIG. 1 is a sectional view of a first embodiment of an infinitely variable rotary resistor assembly wherein the biasing means is enclosed in the resistor housing.
Figure 2:
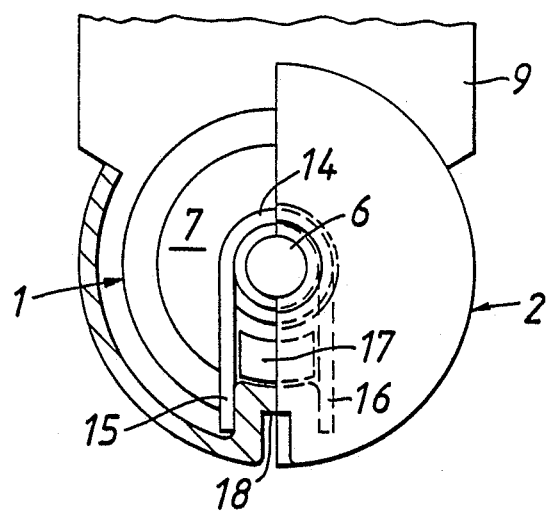
FIG. 2 is a view of the first embodiment of the assembly in the direction of arrow I in FIG. 1 and with its housing partly cut-away.

The embodiment of the invention shown in FIGS. 1 and 2 comprises a resistance element 1 rotatably mounted in a housing 2. The resistance element 1 comprises a disk 3 having a shaft 4 axially extending from a face 5 thereof, and a shaft 6 axially extending from an opposite face 7 thereof. The shaft 4 projects through a circular aperture 8 provided in a circuit board 9 so that the face 5 is adjacent one surface of the circuit board 9. An electric circuit can be formed between slidable electrical contacts (not shown) provided on the face 5 and a resistive circular track (not shown) on the circuit board 9 in substantially conventional manner. The electrical resistance of the assembly can be altered by rotation of the disk 3, and the variable resistor formed by the aforementioned components can be electrically connected to an external circuit by conventional terminals (not shown) provided on the circuit boards.

The housing 2 maybe made of metals and/or plastics materials and has a cylindrical wall 10 and is closed at one end by a disk shaped wall 11. The shaft 6 and the disk 3 of the assembly are received in the housing 2 and retained therein by the circuit board 9 which is secured to and closes the open end of the housing 2. The end of the shaft 6 remote from the disk 3 is reduced in diameter to provide a shoulder 12, and is received in a circular aperture 13 in the wall 11.

The shaft 6 is received in a helical spring 14 and two limbs 15 and 16 formed by the end of the spring 14 extend parallel to each other tangentially away from the shaft 6.

A projection 17 radially remote from the shaft 6 extends perpendicularly away from the face 7 and is interposed between the limbs 15 and 16. A projection 18 extends radially inwardly from the wall 10 on the same radius as the projection 17 so that it is interposed between the ends of the limbs 15 and 16. Thus when the shaft 4 is rotated to alter the resistance provided by the resistance element one of the limbs 15 or 16 abuts the projection 17 and the other of the limbs abuts the projection 18. The spring 14 is therefore deformed and produces a rotational force which tends to return the resistance element 1 to its initial position so that when the shaft is released the resistance element 1 is returned.

In an alternative embodiment of the invention, not illustrated, apertures may be provided in the housing in which the ends of limbs 15 and 16 are received making the projection 18 unnecessary.

By incorporating the spring in the housing of what is basically a conventional rotary variable resistor or potentiometer the assembly of devices such as self centering joystick controls can be simplified since separate biasing mechanisms do not have to be fitted or provided for. The assembly may also enable the construction of more compact aggregate assemblies requiring biasing means.

The embodiment of the invention shown in FIGS. 3, 4 and 5 comprises a rotary variable resistor 20 of conventional type wherein a resistive element within the resistor 20 is rotatably mounted on a shaft (not shown) an end 21 of which is exposed by a circular aperture 22 in the top of the resistor 20. A biasing attachment maybe constructed of metals and/or plastics materials and comprises a base part 23, rotary component 24, spring 25 and cover 26 which can be secured to the resistor 20 so that the rotary component 24 engages the end 21. The base part 23 has a panel 27 of a shape and size, approximately corresponding to the plan view outline of the resistor 20. Three elongate securing elements 28 project downwardly from the periphery of the panel 27. Ends of the securing elements 28 remote from the panel 27 are adapted to hook over the edges of the base 29 of the resistor 20 and thereby enable the biasing attachment to be conveniently secured to the resistor by press fitting. A notch 28a is formed in an upper edge of the housing of the resistor, a position corresponding to the inner surface of a one of the securing elements 28. On the inside of the junction of the securing element 28 and panel 27 is a projection 28b adapted to engage in the notch 28a and thereby prevent relative rotation of the base part 23 and the resistor 20. A circular aperture 30 is located in the panel 27 so that its center overlies the axis of the end 21 of the shaft. A projection 31 is provided on the face of the panel 27 remote from the resistor 20 and adjacent the apperture 30.

The rotary component 24 comprises a disk 32 from one face of which extends a radially disposed blade 33 and from the other face of which projects an axially extending shaft 34 and a projection 35 located toward the periphery of the disk 32. The rotary component 24 is rotatably installed in the base part 23 with a disk 32 locating in the aperture 30 wherein it bears on a shoulder 36 provided on the circumference of the aperture 30 to prevent the disk 32 passing there through. The blade 33 projects downwardly through the aperture 30 to engage in a complimentary channel 37 provided in the end 21 of the shaft. It should be realised that the blade 33 could, as easily be any form of interengaging means such as a hexagonal socket adapted to engage with the end of the shaft. In the unusual event that no provision for interengaging means is made on the end 21 of the shaft engagement could still be achieved by adhesive means. The arrangement of the blade 33 and projections 31 and 35 is such that at a predetermined neutral position the projections 31 and 35 are aligned on the same radius with respect to axis of the shaft 34.

The spring 25 is of well known type and comprises a helically wire wound coil with the ends of the wire extending tangentially from the coil and approximately parallel to each other to form limbs 38 and 39 respectively. The coil of the spring 25 is mounted around the shelf 34 with limbs 38 and 39 extending one each to either side of the projections 31 and 35. When the end 21 of the shaft of the resistor is rotated in order to change a resistance provided thereby, the engagement of the blade 33 in the channel 37 causes corresponding rotation of the rotary component 24 and the consequent misalignment of the projections 31 and 35 causes one of the projections 31 or 35 to abut one of the limbs 38 or 39 and the other of the projections 31 or 35 to abut the other of the limbs 39 or 38 and thereby draw them apart. The spring therefore tends to oppose the rotation so that when the resistor shaft is released the spring 25 causes the rotary 24 and hence the resistor shaft to return to the initial position.

The rotary component 24 and spring 25 are retained in place and protected by cover 26 which comprises a panel 40 corresponding in shape to panel 27. When the panel 40 is located over the base part 23 securing elements 41 projecting downwardly from the periphery of the panel 40 snap engage in cavities 42 located in the periphery of the base part 23 and thereby secure the cover 26 to the base part 23. The end of the shaft 34 remote from the disk 32 is provided with a shoulder 43 and is rotatably received into a circular aperture 44 in the centre of panel 40. The edges of the aperture extend downwardly towards the base part 23 to abut the spring 25 and thereby prevent axial displacement of the spring 25.

This embodiment of the assembly can be readily used for example to convert a conventional non self contering joystick assembly to one of self centering type.

Figure 6:
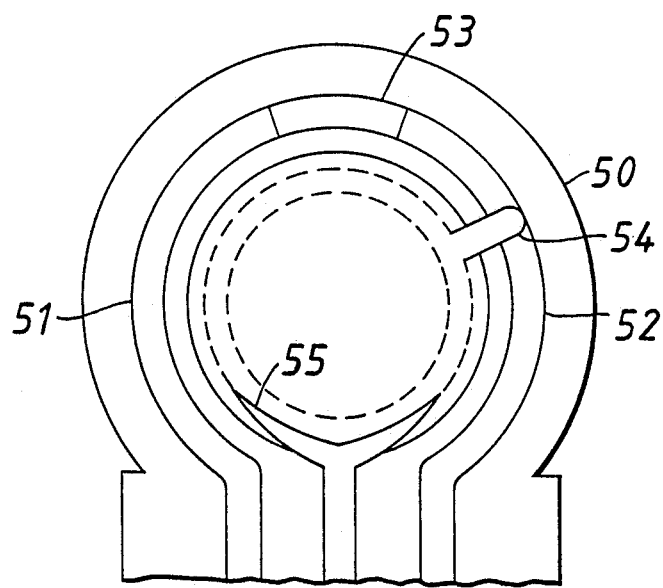
FIG. 6 is a plan view of a circuit board capable of use with the invention to provide a rotary two way switch.

Referring to FIG. 6 the illustration shows a circuit board 50 bearing a substantially circular conductive track which is divided into two parts 51 and 52 by an insulating region part 53 formed by removing part of the conductive track to expose the insulating material of the circuit board 50. Each of the parts 51 and 52 can be connected to an electrical circuit by way of external terminals whereby the assembly can be incorporated into an electric circuit. The circuit board 50 can be incorporated in the earlier described embodiments of the invention by substitution with the circuit board 9, or base 29 so that an electric contact 54 is carried on a rotatable element such as 3 in FIG. 1 and communicates with part 51, 52 or 53 of the track. Another electrical contact 55 is mounted upon the circuit board 50 and is resiliently biased into constant conductive communication with the electrical contact 54. The contact 55 communicates with a third terminal (not shown) whereby the assembly can be incorporated into an electric circuit.

In use the contact 54 is rotationally biased to communicate with part 53 of the track so that no current flows. When a turning force is applied to the electrical element the contact 54, moves into electrical communication with either part 51 or 52 of the track thereby closing a circuit. When the turning force is released the contact is rotated back to its original position by the biasing to contact the insulating part 53 an open the circuit.

I claim:

1. A rotary resistor assembly comprising a housing, a shaft rotatably supported on said housing, a disk shaped element supported on said shaft, said housing have fixed and movable resistive and wiper elements to achieve a variable resistive output in response to rotation of said shaft, a coil torsion spring on said shaft, said spring having projecting legs engageable with abutments on said housing and on said disk to bias said disk and shaft to a predetermined position relative to the housing.

2. An assembly as claimed in claim 1 wherein said abutment means on the housing is provided by the edges of an aperture in the housing wherein the projecting leg is received.

3. An assembly as claimed in claim 1 in which the abutment on said disk is defined by a projection formed on one face of said disk, said projection being received between the projecting legs of said torsion spring and said torsion spring projecting legs extending through an aperture in the housing, said aperture forming the abutment on said housing for engaging said spring legs.

4. The assembly according to claim 1 wherein said fixed resistive element comprises a substantially circular conductive track which is divided into two parts (51 and 52) by an insulating region (53) formed by removing a section of the conductive track element to expose said insulating material, said movable wiper element comprising a track follower rotatably mounted and biased into electrical contact with said resistor track, and electrical terminals for connection of said movable wiper element and said fixed resistive track to an external electrical circuit in order to provide an infinitely variable rotary resistor that is normally biased toward a predetermined angular position for opening the electrical circuit.

5. The assembly according to claim 1 wherein said housing further characterized by a shaft engaging part of said housing to couple said shaft to said housing, said coupling comprising elongated projections that extend over said housing for engaging peripheral edge portions of said housing.

* * * * *